United States Patent
Chao et al.

(10) Patent No.: US 12,062,350 B2
(45) Date of Patent: *Aug. 13, 2024

(54) METHOD AND APPARATUS FOR ADJUSTING IMAGE LUMINANCE, STORAGE MEDIUM, AND ELECTRONIC DEVICE

(71) Applicant: Tencent Technology (Shenzhen) Company Limited, Shenzhen (CN)

(72) Inventors: Juihsiang Chao, Shenzhen (CN); Huai-Che Lee, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/101,007

(22) Filed: Jan. 24, 2023

(65) Prior Publication Data
US 2023/0169935 A1 Jun. 1, 2023

Related U.S. Application Data

(63) Continuation of application No. 17/343,544, filed on Jun. 9, 2021, now Pat. No. 11,587,530, which is a
(Continued)

(30) Foreign Application Priority Data

May 5, 2019 (CN) .......................... 201910368934.3

(51) Int. Cl.
G09G 5/10 (2006.01)
G06T 1/20 (2006.01)

(52) U.S. Cl.
CPC ................. *G09G 5/10* (2013.01); *G06T 1/20* (2013.01); *G09G 2320/0233* (2013.01)

(58) Field of Classification Search
CPC ....... G06T 5/008; G06T 1/20; G06T 2200/28; G09G 5/10; G09G 2360/16
See application file for complete search history.

(56) References Cited

U.S. PATENT DOCUMENTS 8,559,059 B2 * 10/2013 Ozawa .................... G06T 11/60
358/1.9
8,760,723 B2 * 6/2014 Ozawa .................... G06T 11/60
358/1.9
(Continued)

FOREIGN PATENT DOCUMENTS

CN 1667694 A 9/2005
CN 101118721 A 2/2008
(Continued)

OTHER PUBLICATIONS

Ramin Smadani et al., "Geometrical Methods for Lightness Adjustment in YCC Color Spaces", Society of Photo-Optical Instrumentation Engineers (SPIE) Conference Series, Jan. 16, 2006, 3 pgs., Retrieved from the Internet: https://www.spiedigitallibrary.org/conference-proceedings-of-spie/6058/605809/Geometrical-methods-for-lightness-adjustment-in-YCC-color-spaces/10.1117/12.640874.short?SSO=1.
(Continued)

*Primary Examiner* — Olga V Merkoulova
(74) *Attorney, Agent, or Firm* — Morgan, Lewis & Bockius LLP

(57) ABSTRACT

This application discloses a method for adjusting image luminance performed at an electronic device. The method includes: determining that an original luminance of a target pixel in an image is lower than a luminance threshold of the image, the luminance threshold being determined according to luminance of pixels in the image; in accordance with the determination: obtaining a luminance distribution intensity of pixels adjacent to the target pixel in the image; determin-
(Continued)

ing a luminance difference between the luminance threshold and the luminance distribution intensity of the adjacent pixels; and adjusting the original luminance of the target pixel to a corresponding target luminance according to the luminance difference. By preserving the changing characteristic of relative luminance between the target pixel and the adjacent pixel, the luminance adjustment is more consistent with the luminance distribution of the image, thereby achieving a technical effect of improving the luminance adjustment on an image.

22 Claims, 14 Drawing Sheets

Related U.S. Application Data continuation of application No. PCT/CN2020/084581, filed on Apr. 14, 2020.

(56) References Cited

U.S. PATENT DOCUMENTS

| | | | |
|---|---|---|---|
| 2005/0212825 | A1 | 9/2005 | Lee et al. |
| 2006/0245008 | A1 | 11/2006 | Kohashi |
| 2007/0071318 | A1* | 3/2007 | Yamashita ............... G06T 5/40 382/169 |
| 2007/0248282 | A1* | 10/2007 | Suzuki ..................... G06T 5/40 382/282 |
| 2010/0232726 | A1 | 9/2010 | Liu |
| 2011/0150356 | A1* | 6/2011 | Jo ............................ G06T 5/002 382/269 |
| 2014/0009497 | A1 | 1/2014 | Ozawa et al. |
| 2014/0139706 | A1* | 5/2014 | Jang ..................... H04N 25/134 348/241 |
| 2015/0269895 | A1* | 9/2015 | Kao ..................... G09G 3/3426 345/690 |

FOREIGN PATENT DOCUMENTS

| | | |
|---|---|---|
| CN | 103971330 A | 8/2014 |
| CN | 104301624 A | 1/2015 |
| CN | 104517268 A | 4/2015 |
| CN | 104715735 A | 6/2015 |
| CN | 107545871 A | 1/2018 |
| CN | 108307125 A | 7/2018 |
| CN | 108806616 A | 11/2018 |
| CN | 109064431 A | 12/2018 |
| CN | 109064998 A | 12/2018 |
| CN | 109672829 A | 4/2019 |
| CN | 109697738 A | 4/2019 |
| CN | 110120021 A | 8/2019 |
| JP | 2005312008 A | 11/2005 |
| JP | 2007312349 A | 11/2007 |
| JP | 2007316630 A | 12/2007 |
| JP | 2008084302 A | 4/2008 |
| JP | 2008092462 A | 4/2008 |
| JP | 2011018141 A | 1/2011 |
| JP | 2011135182 A | 7/2011 |
| JP | 2012028937 A | 2/2012 |
| JP | 2015197473 A | 11/2015 |
| JP | 2018537748 A | 12/2018 |
| KR | 100590529 B1 | 6/2006 |
| KR | 20100019116 A | 2/2010 |
| WO | WO 2006025486 A1 | 3/2006 |
| WO | WO 2010116522 A1 | 10/2010 |

OTHER PUBLICATIONS

Tencent Technology, Extended European Search Report, EP20801932.3, Jun. 14, 2022, 7 pgs.
Tencent Technology, ISRWO, PCT/CN2020/084581, Jul. 15, 2020, 6 pgs.
Tencent Technology, IPRP, PCT/CN2020/084581, Nov. 2, 2021, 5 pgs.
Tencent Technology, JP Office Action, Japanese Patent Application No. 2021-547520, Aug. 15, 2022, 6 pgs.
Tencent Technology, KR Office Action, Korean Patent Application No. 10-2021-7021752, Aug. 4, 2022, 8 pgs.
Tencent Technology, SG Office Action, Singapore Patent Application No. 11202105754R, Sep. 5, 2022, 9 pgs.

* cited by examiner

METHOD AND APPARATUS FOR ADJUSTING IMAGE LUMINANCE, STORAGE MEDIUM, AND ELECTRONIC DEVICE

CROSS-REFERENCE TO RELATED APPLICATIONS

This application is a continuation application of U.S. patent application Ser. No. 17/343,544, entitled "METHOD AND APPARATUS FOR ADJUSTING IMAGE LUMINANCE, STORAGE MEDIUM, AND ELECTRONIC DEVICE" filed on Jun. 9, 2021, which is a continuation application of PCT Patent Application No. PCT/CN2020/084581, entitled "METHOD AND APPARATUS FOR ADJUSTING IMAGE LUMINANCE, STORAGE MEDIUM, AND ELECTRONIC DEVICE" filed on Apr. 14, 2020, which claims priority to Chinese Patent Application No. 201910368934.3, entitled "METHOD AND APPARATUS FOR ADJUSTING IMAGE LUMINANCE, STORAGE MEDIUM, AND ELECTRONIC DEVICE" and filed with the China National Intellectual Property Administration on May 5, 2019, all of which are incorporated herein by reference in their entirety.

FIELD OF THE TECHNOLOGY

This application relates to the field of computers, and specifically, to a technology for adjusting image luminance.

BACKGROUND OF THE DISCLOSURE

The conventional method for adjusting a dark part of an image is mainly to perform luminance enhancement on all pixels with luminance less than a luminance threshold in the image, to achieve visibility of details in the dark part of the entire image. However, such an adjustment method results in an important problem, that is, because relative luminance changes with adjacent pixels are not taken into account, luminance of pixels of an entire picture will be enhanced as long as the pixel luminance is less than an absolute threshold. Consequently, contrast detail changes in adjacent pixel areas are sacrificed.

For the foregoing problem, no effective solution has been provided yet.

SUMMARY

Embodiments of this application provide a method and an apparatus for adjusting image luminance, a storage medium, and an electronic device, so that luminance adjustment is more consistent with luminance propagation of an original image, achieving a technical effect of improving an adjustment effect of luminance adjustment on an image.

According to an aspect of the embodiments of this application, a method for adjusting image luminance is performed at an electronic device, the method including:
  determining a target pixel with original luminance lower than a luminance threshold in an original image, the luminance threshold being a threshold determined according to luminance of pixels in the original image;
  obtaining a luminance distribution intensity of pixels adjacent to the target pixel in the original image;
  determining a difference between the luminance threshold and the luminance distribution intensity of the adjacent pixels; and
  adjusting the target pixel to corresponding target luminance according to the difference and the original luminance of the target pixel.

According to another aspect of the embodiments of this application, an apparatus for adjusting image luminance is further provided, including:
  a first determining module, configured to determine a target pixel with original luminance lower than a luminance threshold in an original image, the luminance threshold being a threshold determined according to luminance of pixels in the original image;
  an obtaining module, configured to obtain a luminance distribution intensity of pixels adjacent to the target pixel in the original image;
  a second determining module, configured to determine a difference between the luminance threshold and the luminance distribution intensity of the adjacent pixels; and
  an adjustment module, configured to adjust the target pixel to corresponding target luminance according to the difference and the original luminance of the target pixel.

In some embodiments, the apparatus further includes:
  a cancellation module, configured to cancel luminance adjustment of the target pixel when the luminance distribution intensity is higher than the luminance threshold.

According to another aspect of the embodiments of this application, a non-transitory computer-readable storage medium is further provided, the storage medium storing a plurality of computer programs, the computer programs being configured to perform the method according to any one of the foregoing aspects when being executed by a processor of an electronic device.

According to another aspect of the embodiments of this application, an electronic device is further provided, including a memory and a processor, the memory storing a computer program, the processor being configured to perform the method according to any one of the foregoing aspects by using the computer program.

According to another aspect of the embodiments of this application, a computer program product including instructions is further provided, the computer program product, when run on a computer, causing the computer to perform the method according to any one of the foregoing aspects.

In the embodiments of this application, a target pixel with original luminance lower than a luminance threshold is determined in an original image, the luminance threshold being a threshold determined according to luminance of pixels in the original image; a luminance distribution intensity of pixels adjacent to the target pixel in the original image is obtained; a difference between the luminance threshold and the luminance distribution intensity of the adjacent pixels is determined; and the target pixel is adjusted to corresponding target luminance according to the difference and the original luminance of the target pixel. The luminance threshold is determined according to the luminance of the pixels in the original image, the target pixel with original luminance lower than the luminance threshold is determined in the original image, and the original luminance of the target pixel is adjusted according to the difference between the luminance threshold and the luminance distribution intensity. Because the luminance threshold is dynamically determined according to the luminance of the pixels in the original image, the luminance threshold is more consistent with luminance propagation of the pixels in the original image. Through dynamic luminance adjustment according to the difference between the luminance threshold and the luminance distribution intensity, luminance of an adjacent pixel can be taken into account for the luminance adjustment of the target pixel, and a changing characteristic of relative luminance between the target pixel and the adjacent pixel is reserved. The luminance adjustment is more consistent with the luminance propagation of the original image, thereby achieving the technical effect of improving an adjustment effect of luminance adjustment on an image.

BRIEF DESCRIPTION OF THE DRAWINGS

The accompanying drawings described herein are used for providing a further understanding of this application, and form part of this application. Exemplary embodiments of this application and descriptions thereof are used for explaining this application, and do not constitute any inappropriate limitation to this application. In the accompanying drawings.

DESCRIPTION OF EMBODIMENTS

In order to make a person skilled in the art better understand the solutions of this application, the following clearly and completely describes the technical solutions in the embodiments of this application with reference to the accompanying drawings in the embodiments of this application. Apparently, the described embodiments are only some of the embodiments of this application rather than all of the embodiments. All other embodiments obtained by a person of ordinary skill in the art based on the embodiments of this application without creative efforts shall fall within the protection scope of this application.

In this specification, claims, and accompanying drawings of this application, the terms "first", "second", and so on are intended to distinguish similar objects but do not necessarily indicate a specific order or sequence. It is to be understood that the data termed in such a way are interchangeable in appropriate circumstances, so that the embodiments of this application described herein can be implemented in orders other than the order illustrated or described herein. Moreover, the terms "include", "contain", and any other variants thereof mean to cover the non-exclusive inclusion. For example, a process, method, system, product, or electronic device that includes a list of steps or units is not necessarily limited to those steps or units that are clearly listed, but may include other steps or units not expressly listed or inherent to such a process, method, system, product, or electronic device.

Figure 1:
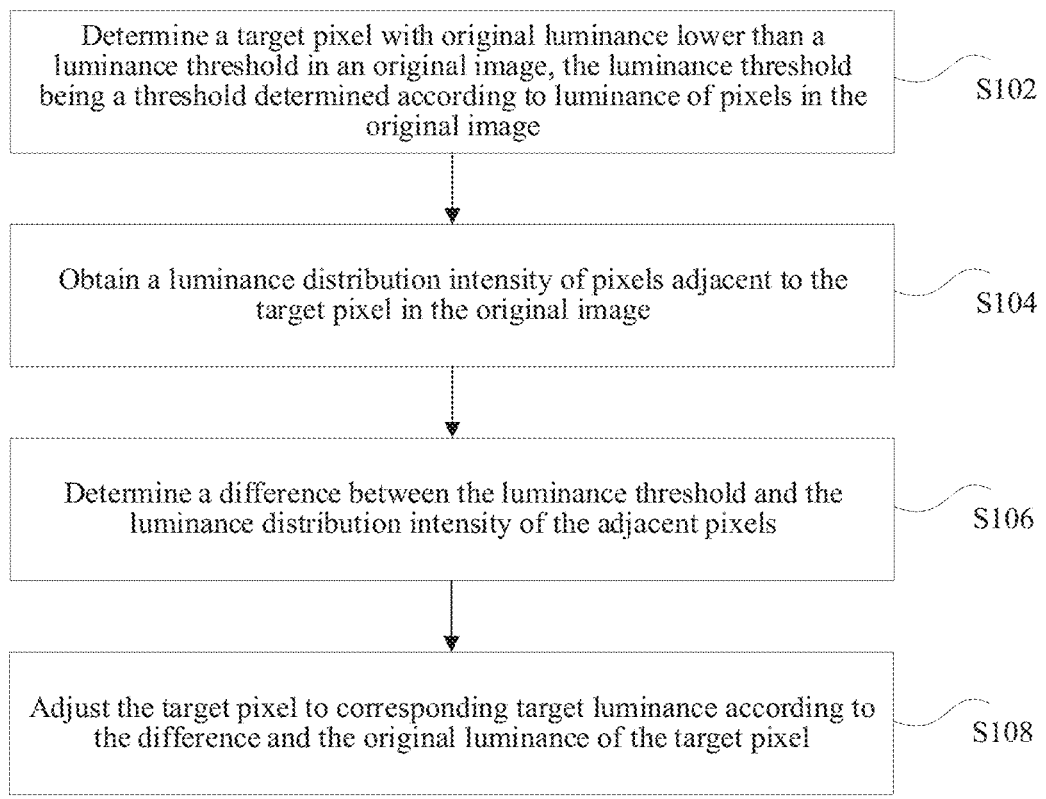
FIG. 1 is a schematic diagram of a method for adjusting image luminance according to an embodiment of this application.

According to an aspect of the embodiments of this application, a method for adjusting image luminance is provided. As shown in FIG. 1, the method includes:

S102. Determine a target pixel with original luminance lower than a luminance threshold in an original image, the luminance threshold being a threshold determined according to luminance of pixels in the original image.

S104. Obtain a luminance distribution intensity of pixels adjacent to the target pixel in the original image.

S106. Determine a difference between the luminance threshold and the luminance distribution intensity of the adjacent pixels.

S108. Adjust the target pixel to corresponding target luminance according to the difference and the original luminance of the target pixel.

Figure 2:
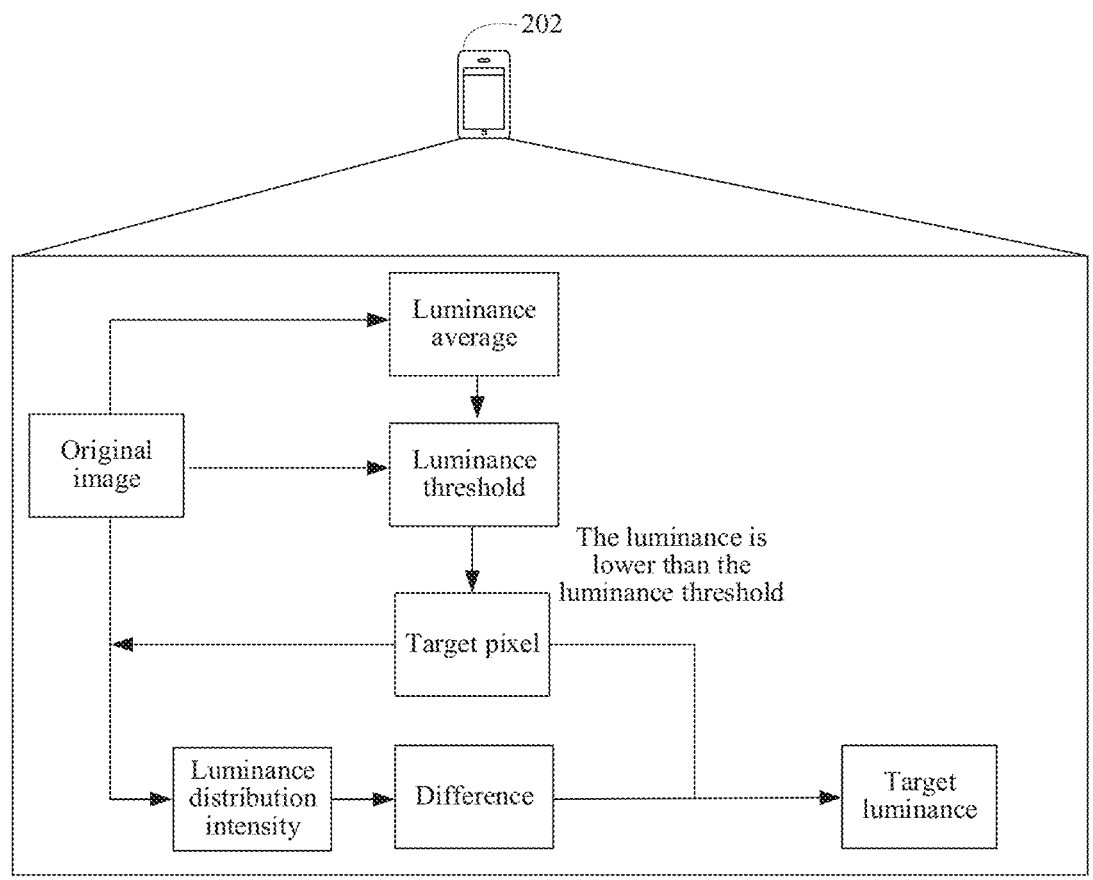
FIG. 2 is a schematic diagram of an application environment of a method for adjusting image luminance according to an embodiment of this application.

In some embodiments, the foregoing method for adjusting image luminance may be applied to a hardware environment formed by a terminal 202 shown in FIG. 2. As shown in FIG. 2, the terminal 202 determines a target pixel with original luminance lower than a luminance threshold in an original image, the luminance threshold being a threshold determined according to luminance of pixels in the original image; and obtains a luminance distribution intensity of pixels adjacent to the target pixel in the original image. The luminance distribution intensity of the adjacent pixels described herein may reflect luminance of the adjacent pixel of the target pixel. In some embodiments, for a plurality of adjacent pixels adjacent to the target pixel, the luminance distribution intensity may be an average luminance of the plurality of adjacent pixels, to comprehensively reflect luminance of the adjacent pixels.

A difference between the luminance threshold and the luminance distribution intensity of the adjacent pixels is determined, and the target pixel is adjusted to corresponding target luminance according to the difference and the original luminance of the target pixel. In some embodiments, the method for adjusting image luminance may be applied to, but not limited to, a scenario in which an image is displayed on a terminal. The terminal may include, but not limited to: a mobile phone, a tablet computer, a personal computer, a smart wearable device, a smart home device, and the like. The method for adjusting image luminance may be applied to, but not limited to, a client installed on the terminal. The client may be, but not limited to, various applications, for example, an on-line education application, an instant messaging application, a community space application, a game application, a shopping application, a browser application, a financial application, a multimedia application, and a live broadcast application. Specifically, the method for adjusting image luminance may be applied to, but not limited to, a scenario in which an image is displayed in a multimedia application installed on the foregoing mobile phone, or may be applied to, but not limited to, a scenario in which an image is displayed in an instant messaging application installed on the foregoing smart wearable device, to improve an adjustment effect when luminance adjustment is performed on the image. The foregoing description is merely an example, which is not limited in this embodiment.

The foregoing, method for adjusting image luminance may be further applied to a server. The server may be configured to provide a luminance adjustment service for the terminal. By performing the method, the server may determine the target luminance for luminance adjustment of the target pixel, and transmit the target luminance to the terminal, so that the terminal performs luminance adjustment on the target pixel according to the target luminance. The server may be an independent server, or may be a server in a cluster or a cloud server.

In some embodiments, the adjacent pixel adjacent to the target pixel may be, but not limited to, a pixel within a predetermined range around the target pixel. The predetermined range may be, but not limited to, a distance value, and pixels with distances from the target pixel being less than the distance value are all determined to be adjacent pixels adjacent to the target pixel.

In some embodiments, the adjacent pixel adjacent to the target pixel may be, but not limited to, a point located in a predetermined direction of the target pixel. For example, adjacent pixels adjacent to the target pixel are eight points located above, below, left, right, top left, bottom left, top right, and bottom right of the target pixel.

In some embodiments, the luminance threshold is determined according to the luminance of the pixels in the original image. In a possible implementation, the luminance threshold may be determined according to an average of the luminance of the pixels in the original image. If an average luminance of the pixels in the original image is relatively high, the image itself may be relatively bright, and then a relatively high luminance threshold may be determined. If an average luminance of the pixels in the original image is relatively low, the image itself may be relatively dark, and then a relatively low luminance threshold may be determined. By using such a manner of dynamically determining the luminance threshold, luminance adjustment is more flexible and more consistent with true contrast of the original image.

In some embodiments, to improve efficiency of luminance adjustment for the original image, in a possible implementation, the foregoing manner of determining the difference between the luminance threshold and the luminance distribution intensity of the adjacent pixels in S106 may include:

determining the difference between the luminance threshold and the luminance distribution intensity of the adjacent pixels when the luminance distribution intensity is lower than the luminance threshold. That is, when it is determined that the luminance of the adjacent pixel of the target pixel is relatively low, the difference between the luminance threshold and the luminance distribution intensity of the adjacent pixels may be determined, to perform luminance adjustment on the target pixel.

In some embodiments, if the luminance distribution intensity is higher than the luminance threshold, the luminance adjustment may not be performed on the target pixel, to reserve pixel contrast of the original image at the target pixel. For example, after the foregoing step S104, the terminal may cancel luminance adjustment of the target pixel when the luminance distribution intensity is higher than the luminance threshold.

In this manner, luminance adjustment is performed on the target pixel when the luminance of the adjacent pixel is relatively low, and luminance adjustment of the target pixel is canceled when the luminance of the adjacent pixel is relatively high, which can effectively reduce a quantity of pixels for the luminance adjustment, and improve the efficiency of luminance adjustment of the image.

Figure 3:
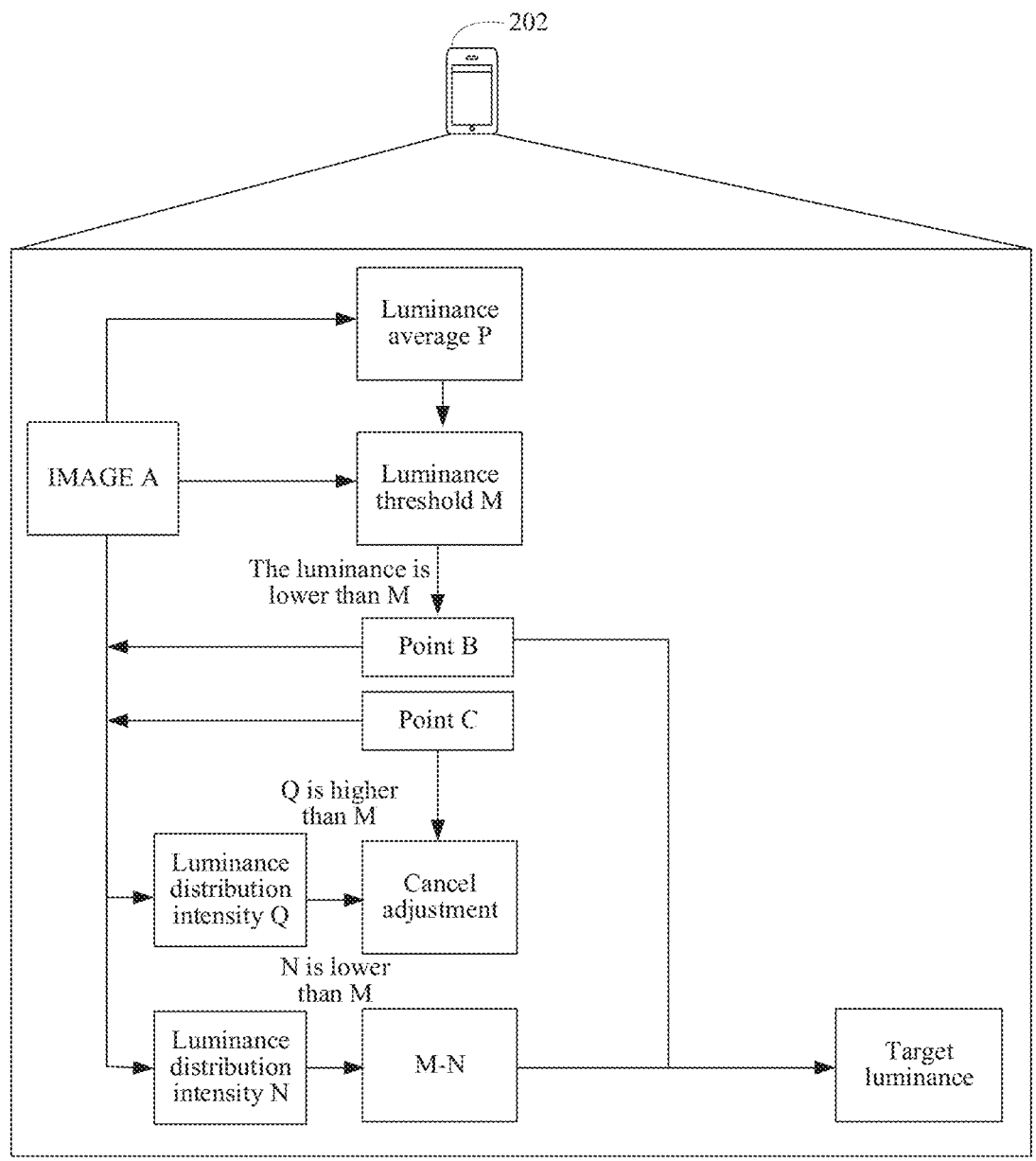
FIG. 3 is a schematic diagram of a method for adjusting image luminance according to an embodiment of this application.

In some embodiments, as shown in FIG. 3, an original image that needs to be displayed on the terminal is IMAGE A, where an average luminance of pixels in IMAGE A is P. A luminance threshold determined by the terminal according to the average luminance P is M. The terminal determines target pixels with luminance lower than M in IMAGE A as a point B and a point C. The terminal obtains a luminance distribution intensity N of an adjacent pixel adjacent to the point B and a luminance distribution intensity Q of an adjacent pixel adjacent to the point C in IMAGE A. When the luminance distribution intensity N corresponding to the point B is lower than M, a difference between M and N is determined, namely M-N, and a target luminance adjustment curve corresponding to M-N is determined as S1. Original luminance L of the point B is then adjusted to target luminance L' shown on the target luminance adjustment curve according to the target luminance adjustment curve S1. When the luminance distribution intensity Q corresponding to the point C is higher than M, luminance adjustment of the point C is canceled.

In this embodiment of this application, the manner of adjusting the target pixel to corresponding target luminance according to the difference and the original luminance of the target pixel in S108 may include:

determining a target luminance adjustment curve corresponding to the difference. The target luminance adjustment curve may reflect the target luminance that needs to be adjusted for the target pixel according to relative luminance changes of different target pixels and luminance propagation intensities of adjacent pixels.

Therefore, the original luminance of the target pixel is then adjusted to the corresponding target luminance according to the target luminance adjustment curve.

By using this manner of luminance adjustment based on the target luminance adjustment curve, dynamic luminance adjustment of the target pixel is implemented.

As can be seen, through the foregoing steps, the luminance threshold is determined according to the luminance of the pixels in the original image, the target pixel with original luminance lower than the luminance threshold is determined in the original image, and the original luminance of the target pixel is adjusted according to the difference between the luminance threshold and the luminance distribution intensity. Because the luminance threshold is dynamically determined according to the luminance of the pixels in the original image, the luminance threshold is more consistent with luminance propagation of the pixels in the original image. Through dynamic luminance adjustment according to the difference between the luminance threshold and the luminance distribution intensity, luminance of an n adjacent pixel can be taken into account for the luminance adjustment of the target pixel, and a changing characteristic of relative luminance between the target pixel and the adjacent pixel is reserved. The luminance adjustment is more consistent with the luminance propagation of the original image, thereby achieving the technical effect of improving an adjustment effect of luminance adjustment on an image.

In some embodiments, the determining a target luminance adjustment curve corresponding to the difference includes:

S11. Determine an adjustment intensity corresponding to the target pixel according to the difference, a greater difference indicating a greater adjustment intensity.

S12. Determine the target luminance adjustment curve according to the adjustment intensity and the luminance threshold.

The adjustment intensity may reflect the intensity of luminance adjustment of the target pixel. A greater adjustment intensity indicates higher target luminance after the target pixel is adjusted, and a smaller adjustment intensity indicates lower target luminance after the target pixel is adjusted.

In some embodiments, a plurality of luminance adjustment curves may be preset, to determine, according to the adjustment intensity determined by using the difference and the average luminance of the pixels in the original image, a luminance adjustment curve corresponding to the luminance threshold from the luminance adjustment curves as the target luminance adjustment curve.

For example, when luminance of a pixel in the image is lower than the luminance threshold, the basis for luminance adjustment may be achieved by a relationship between a luminance distribution intensity of an adjacent pixel around the pixel and the luminance threshold. S represents an adjustment intensity of the luminance of the target pixel. The basis is that when the luminance distribution intensity of the adjacent pixels around the target pixel is much lower than a luminance threshold T, the luminance of the pixel needs to be enhanced a little more. Conversely, when the luminance distribution intensity of the adjacent pixels around the target pixel is slightly lower than the luminance threshold T, the luminance of the pixel only needs to be slightly enhanced. By using such a method, it is ensured that when the pixel falls in a large dark area, luminance of the dark area will be greatly enhanced. Conversely, when the pixel falls in a small dark area but luminance of adjacent pixels is too high, the dark area will only be slightly enhanced to ensure uniqueness of the dark area.

Figure 4:
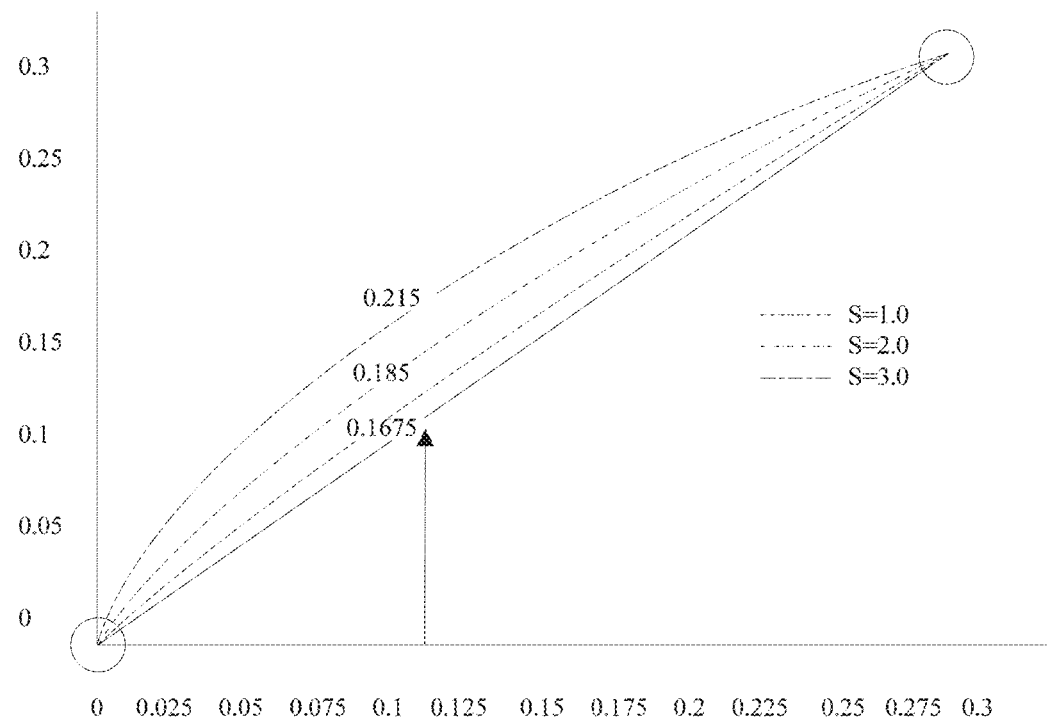
FIG. 4 is a schematic diagram 1 of another method for adjusting image luminance according to an embodiment of this application.

In some embodiments, as shown in FIG. 4, when the luminance of the target pixel needs to be adjusted, it is ensured according to the foregoing situational result that an adjusted luminance intensity converges between a luminance value 0 and the luminance threshold T. A curvature of the target luminance adjustment curve is adjusted according to the foregoing adjustment intensity S. For example, an original luminance value is 0.15, and according to an impact of different adjustment intensities S (1.0, 2.0, 3.0), the luminance is enhanced to different target luminance (0.165, 0.185, 0.215).

In some embodiments, the adjustment intensity may be, but not limited to, determined by using the following formula:

$$S=(T-La)*k,$$

where S is the adjustment intensity, T is the luminance threshold, La is the luminance distribution intensity of the adjacent pixels, and k is a constant factor.

In some embodiments, the target luminance adjustment curve may be, but not limited to, determined by using the following formula:

$$L'=Lc+S*\sin(PI*Lc/T),$$

where L' is the target luminance adjustment curve, Lc is the original luminance, and PI is a constant $\pi$.

In some embodiments, the foregoing luminance adjustment formula does not need to use a large number of time-consuming mathematical operation functions, and the entire mathematical operation logic is very suitable for directly running on a graphics processing unit (GPU) pipeline (by using a shader). This may not only be connected with a Mipmap function, but also ensure that overall operating costs are minimized. Requirements for computing efficiency and memory usage of the device are relatively low, so that a high-quality dark part adjustment and rendering mechanism can be implemented on a smartphone with poor requirements for computing efficiency and memory usage.

In some embodiments, before the determining a target pixel with original luminance lower than a luminance threshold in an original image, the method further includes:

S21. Determine the average luminance of the pixels in the original image by using a Mipmap function of a GPU graphics pipeline.

S22. Determine the luminance threshold according to the average luminance of the pixels in the original image, a greater luminance average indicating a greater luminance threshold.

In the entire luminance adjustment process, the average luminance of the entire image needs to be taken into account, to dynamically generate the luminance threshold, and the threshold is used to measure which pixels in the image need luminance adjustment. When luminance of a pixel is adjusted, a luminance distribution intensity of a neighboring pixel of the pixel, that is, an adjacent pixel needs to be calculated first, and an intensity of luminance adjustment required is determined by using the luminance distribution intensity. In this part, if a conventional CPU is used for calculations, the pixels of the entire image need to be polled first, to calculate the average luminance. When the luminance threshold is generated from the average luminance, the entire image needs to be polled again to compare the luminance of the pixel with the luminance threshold, to further determine pixels whose luminance needs to be adjusted. Secondly, when the luminance of the pixel is adjusted again, luminance of a neighboring pixel of the pixel, that is, the adjacent pixel needs to be polled to calculate the adjacent luminance distribution intensity as the basis for luminance adjustment of the pixel later. The various calculations are excessively time-consuming, and can hardly meet requirements of dynamically adjusting luminance of a dark part for an image with a large screen resolution.

In some embodiments, current smartphones are all equipped with a high-performance GPU graphics pipeline architecture. The GPU graphics pipelines are all formulated following the same standard (OpenGL ES). Therefore, if the calculation of the average luminance and the adjacent luminance distribution intensity is implemented by using the GPU graphics pipeline, not only the calculation time required can be greatly reduced, but also it can be ensured that this method can run on most smartphones.

In some embodiments, there are several ways to calculate the average luminance and the luminance distribution intensity of the neighboring pixel, that is, the adjacent pixel by using the GPU graphics pipeline. For example, a Compute Shader program may be written for the calculation, or a plurality of times of texture dimensionality reduction rendering is performed for the calculation.

In some embodiments, the average luminance and the luminance distribution intensity may be determined by using the Mipmap function of the GPU graphics pipeline.

In some embodiments, the determining the average luminance of the pixels in the original image by using a Mipmap function of a GPU graphics pipeline includes:

S31. Generate a first image corresponding to the original image by using the Mipmap function, a resolution of the first image being 1×1.

S32. Determine luminance of the first image as the average luminance of the pixels in the original image.

In some embodiments, when a Mipmap generation instruction is issued to the GPU graphics pipeline, the GPU respectively generates images with resolutions lower than that of the original image in a power-of-two attenuation manner, and the luminance of the first image with the resolution of 1×1 is determined as the average luminance of the pixels in the original image.

Figure 5:
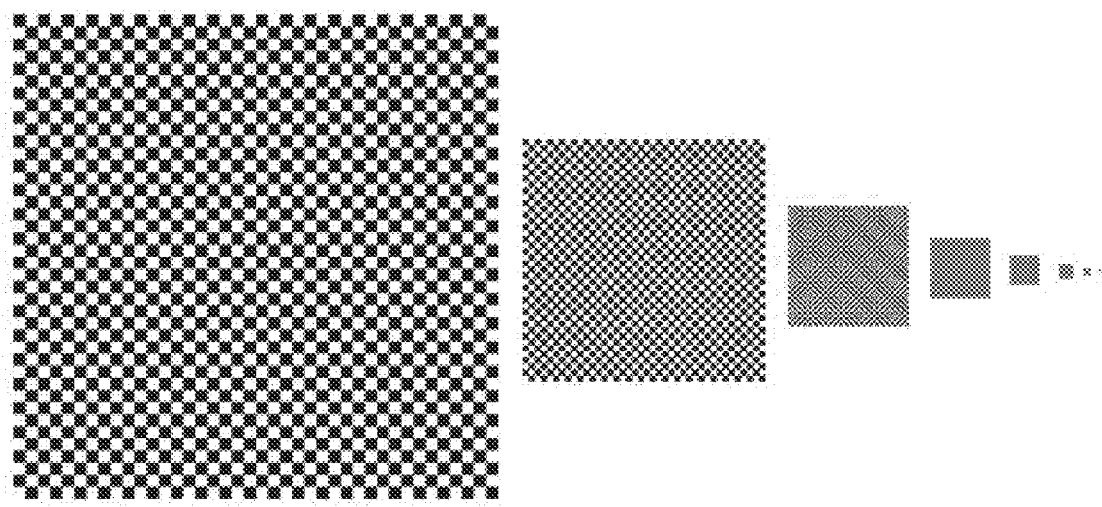
FIG. 5 is a schematic diagram 2 of another method for adjusting image luminance according to an embodiment of this application.

For example, as shown in FIG. 5, a leftmost original image is an original image with a 128×128 resolution. When the Mipmap generation instruction is issued to the GPU graphics pipeline, the GPU respectively generates reduced images with different resolutions such as 64×64, 32×32, 16×16, 8×8, 4×4, 2×2, and 1×1 in the power-of-two attenuation manner. A color of each pixel in a small image at each order is of a color value generated by averaging colors of four pixels in a corresponding position of a large image at a previous order. In other words, a small image at each order may be regarded as a color average result of a large image at a previous order. Through the foregoing process, a color value of a pixel in an image with a 1×1 resolution may be regarded as a color value obtained after colors of all pixels in an original image with a 128×128 resolution are averaged. Because the Mipmap function is directly generated by hardware in the GPU graphics pipeline, generation efficiency thereof is very good, and may be regarded as a weapon with almost no additional computing cost.

By using the Mipmap function, an average of all colors of an entire picture can be obtained from a 1×1 pixel image at a very low cost. Accordingly, a pixel luminance value of the 1×1 image may be used as the luminance threshold to be used as a basis for determining a dark part whose luminance needs to be adjusted subsequently.

In some embodiments, the obtaining a luminance distribution intensity of pixels adjacent to the target pixel in the original image includes:

S41. Generate a second image corresponding to the original image by using a Mipmap function of a GPU graphics pipeline, a resolution of the second image being less than a resolution of the original image.

S42. Obtain a first position of the target pixel on the original image.

S43. Determine a second position corresponding to the first position on the second image.

S44. Determine luminance of a pixel located at the second position on the second image as the luminance distribution intensity of the adjacent pixels.

In some embodiments, the Mipmap function may be used to accelerate the process of calculating the luminance distribution intensity of the adjacent pixels. Assuming that a middle-level low resolution (for example: 64×64) of a Mipmap is used as a reference, a color luminance value of each pixel in an image with the resolution of 64×64 may be regarded as a color luminance average of a block (image width divided by 64 and image height divided by 64) in the original image.

Figure 6:
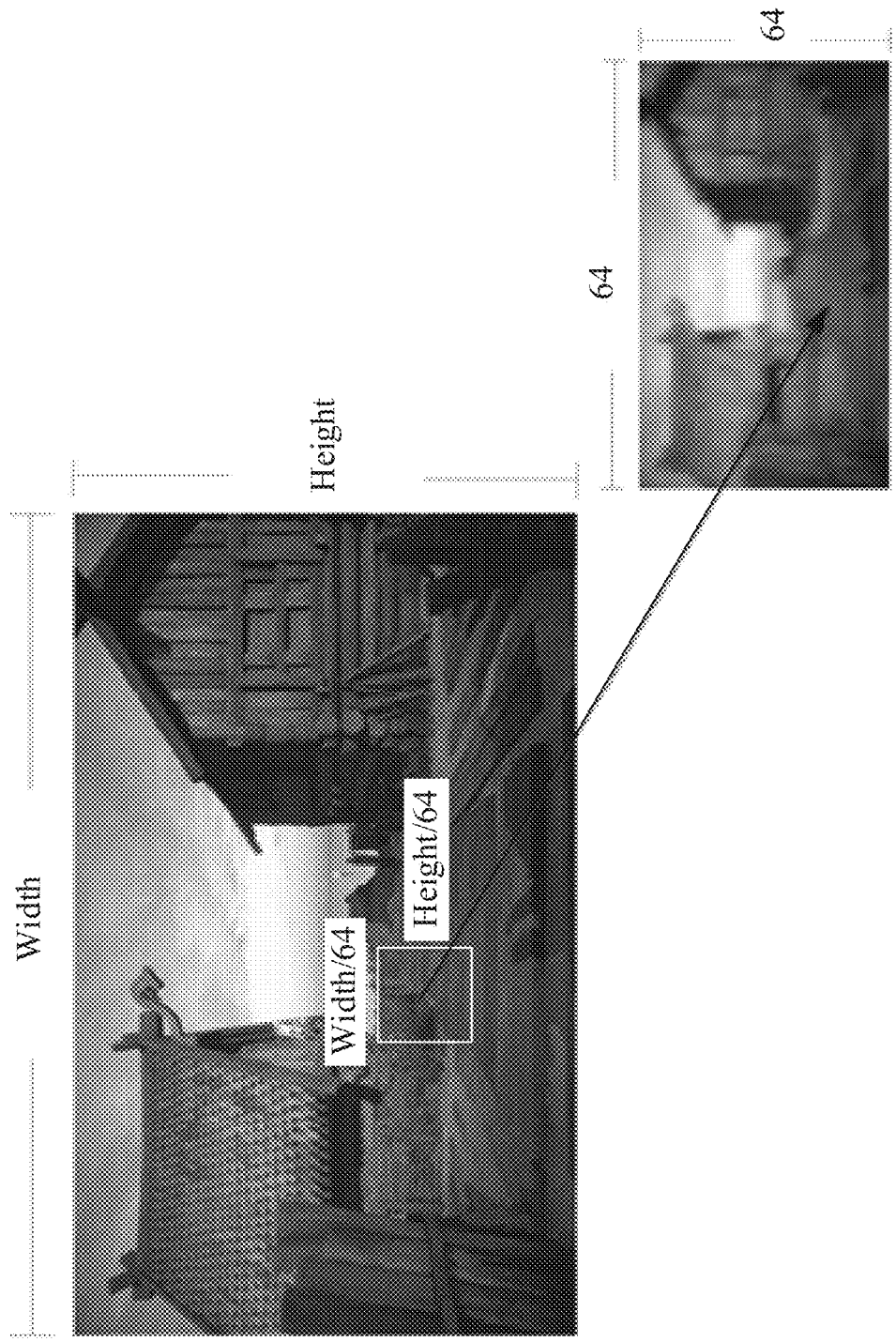
FIG. 6 is a schematic diagram 3 of another method for adjusting image luminance according to an embodiment of this application.

In some embodiments, as shown in FIG. 6, when a pixel luminance value of the original image is less than the luminance threshold, that is, the luminance needs to be adjusted, the same image coordinate position of the image with the 64×64 resolution may be directly queried, for example, a coordinate position of a target pixel in the original image is (0.3, 0.5), and luminance of a corresponding pixel at the image coordinate position (0.3, 0.5) in the image with the 64×64 resolution may be queried. By using an internal difference mechanism of computer graphics texture, average luminance data representing a color of the block (image width divided by 64 and image height divided by 64) neighboring the pixel in the original image is returned. The average luminance data may be used as the luminance distribution intensity of the neighboring pixel, that is, the adjacent pixel, which is the basis for adjusting the luminance of the pixel.

For ease of description, the foregoing method embodiments are stated as a combination of a series of action combinations. However, a person skilled in the art is to know that this application is not limited to the described action sequence, because according to this application, some steps may be performed in another sequence or simultaneously. In addition, a person skilled in the art is also to understand that the embodiments described in this specification are all exemplary embodiments, and the involved actions and modules are not necessarily required to this application.

According to the descriptions in the foregoing implementations, a person skilled in the art may clearly learn that the method according to the foregoing embodiment may be implemented by software plus a necessary universal hardware platform, or by using hardware, but in many cases, the former is a preferred implementation. Based on such an understanding, the technical solutions of this application essentially or the part contributing to the related art may be implemented in the form of a software product. The computer software product is stored in a storage medium (such as a read-only memory (ROM)/random access memory (RAM), a magnetic disk, or an optical disc), and includes several instructions for instructing a terminal device (which may be a mobile phone, a computer, a server, a network device, or the like) to perform the method described in the embodiments of this application.

Figure 7A:
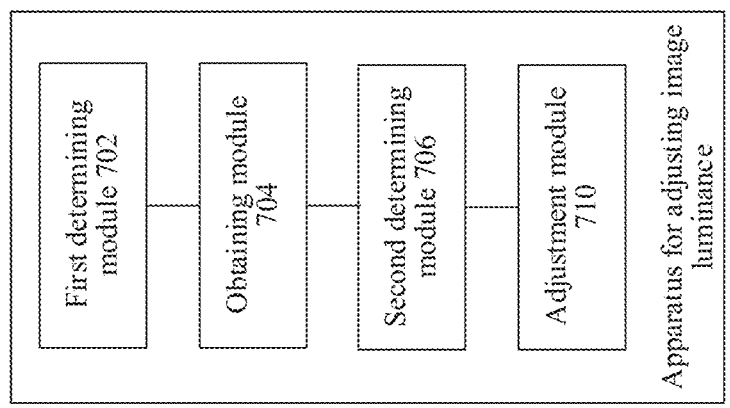
FIG. 7a is a schematic diagram 1 of an apparatus for adjusting image luminance according to an embodiment of this application.

According to another aspect of the embodiments of this application, an apparatus for adjusting image luminance configured to implement the foregoing method for adjusting image luminance is further provided. As shown in FIG. 7a, the apparatus includes:

a first determining module 702, configured to determine a target pixel with original luminance lower than a luminance threshold in an original image, the luminance threshold being a threshold determined according to luminance of pixels in the original image;

an obtaining module 704, configured to obtain a luminance distribution intensity of pixels adjacent to the target pixel in the original image;

a second determining module 706, configured to determine a difference between the luminance threshold and the luminance distribution intensity of the adjacent pixels; and an adjustment module 710, configured to adjust the target pixel to corresponding target luminance according to the difference and the original luminance of the target pixel.

Figure 7B:
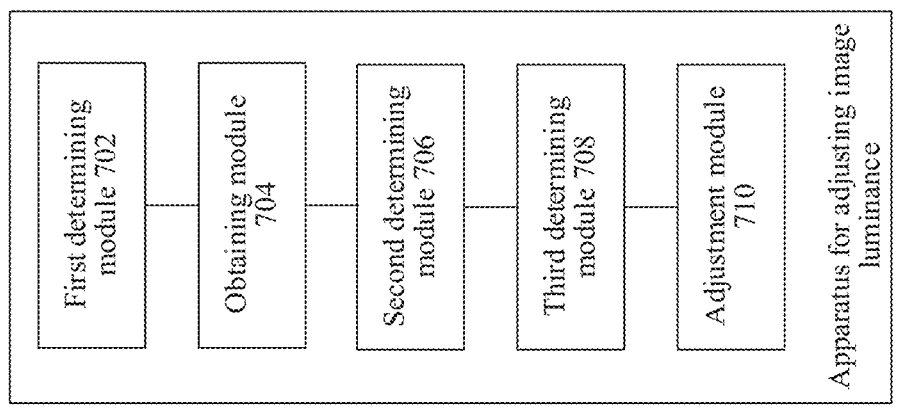
FIG. 7b is a schematic diagram 1 of an apparatus for adjusting image luminance according to an embodiment of this application.

In some embodiments, as shown in FIG. 7b, the apparatus further includes:

a third determining module 708, configured to determine a target luminance adjustment curve corresponding to the difference; and the adjustment module 710 being specifically configured to adjust the original luminance of the target pixel to the corresponding target luminance according to the target luminance adjustment curve.

In some embodiments, the second determining module is specifically configured to:

determine the difference between the luminance threshold and the luminance distribution intensity of the adjacent pixels when the luminance distribution intensity is lower than the luminance threshold.

In some embodiments, the adjacent pixel adjacent to the target pixel may be, but not limited to, a pixel within a predetermined range around the target pixel. The predetermined range may be, but not limited to, a distance value, and pixels with distances from the target pixel being less than the distance value are all determined to be adjacent pixels adjacent to the target pixel.

In some embodiments, the adjacent pixel adjacent to the target pixel may be, but not limited to, a point located in a predetermined direction of the target pixel. For example, adjacent pixels adjacent to the target pixel are eight points located above, below, left, right, top left, bottom left, top right, and bottom right of the target pixel.

In some embodiments, the luminance threshold is determined according to the luminance of the pixels in the original image. In a possible implementation, the luminance threshold may be determined according to an average of the luminance of the pixels in the original image. For example, if an average luminance of the pixels in the original image is relatively high, the image itself may be relatively bright, and then a relatively high luminance threshold may be determined. If an average luminance of the pixels in the original image is relatively low, the image itself may be relatively dark, and then a relatively low luminance threshold may be determined. By using such a manner of dynamically determining the luminance threshold, luminance adjustment is more flexible and more consistent with true contrast of the original image.

By using the foregoing apparatus, the luminance threshold is determined according to the luminance of the pixels in the original image, the target pixel with original luminance lower than the luminance threshold is determined in the original image, and the original luminance of the target pixel is adjusted according to the difference between the luminance threshold and the luminance distribution intensity. Because the luminance threshold is dynamically determined according to the luminance of the pixels in the original image, the luminance threshold is more consistent with luminance propagation of the pixels in the original image. Through dynamic luminance adjustment according to the difference between the luminance threshold and the luminance distribution intensity, luminance of an adjacent pixel can be taken into account for the luminance adjustment of the target pixel, and a changing characteristic of relative luminance between the target pixel and the adjacent pixel is reserved. The luminance adjustment is more consistent with the luminance propagation of the original image, thereby achieving the technical effect of improving an adjustment effect of luminance adjustment on an image.

Figure 8:
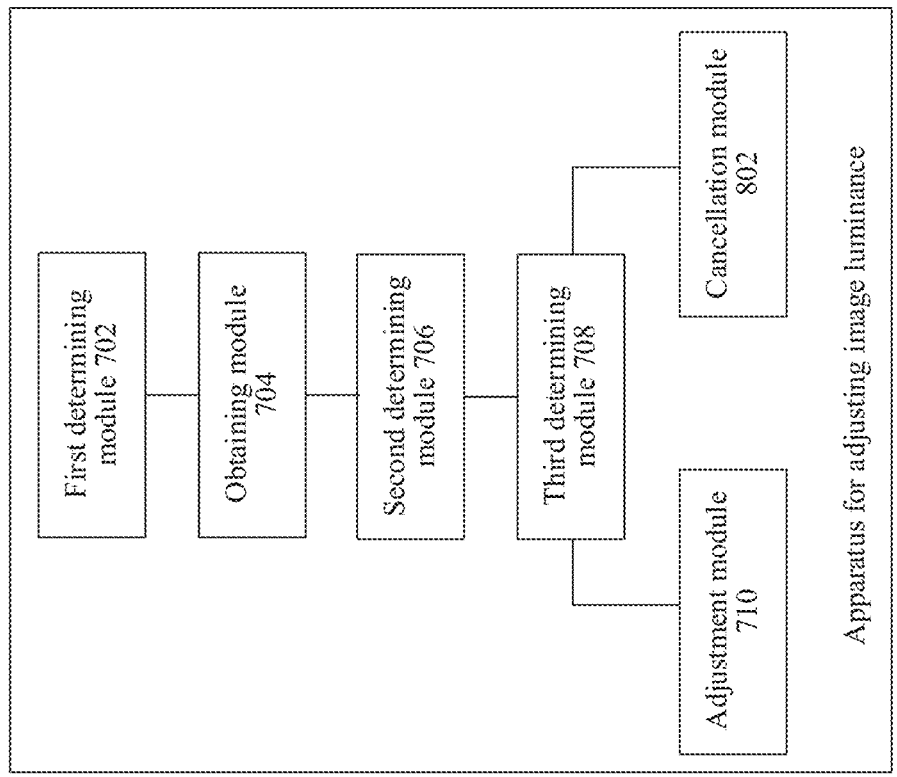
FIG. 8 is a schematic diagram 2 of an apparatus for adjusting image luminance according to an embodiment of this application.

FIG. 8 is a schematic diagram 2 of an apparatus for adjusting image luminance according to an embodiment of this application. Optionally, the foregoing apparatus further includes:

a cancellation module 802, configured to cancel luminance adjustment of the target pixel when the luminance distribution intensity is higher than the luminance threshold.

Figure 9:
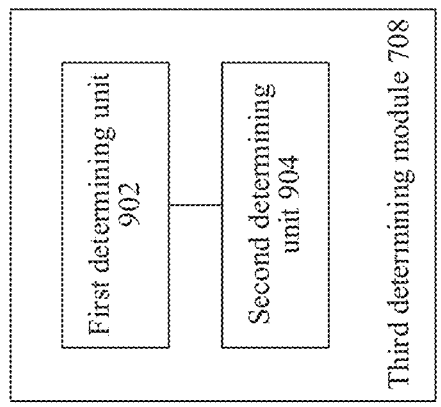
FIG. 9 is a schematic diagram 3 of an apparatus for adjusting image luminance according to an embodiment of this application.

FIG. 9 is a schematic diagram 3 of an apparatus for adjusting image luminance according to an embodiment of this application. Optionally, the third determining module 708 includes:

a first determining unit 902, configured to determine an adjustment intensity corresponding to the target pixel according to the difference, a greater difference indicating a greater adjustment intensity; and a second determining unit 904, configured to determine the target luminance adjustment curve according to the adjustment intensity and the luminance threshold.

In some embodiments, a plurality of luminance adjustment curves may be preset, to determine, according to the adjustment intensity determined by using the difference and the average luminance of the pixels in the original image, a luminance adjustment curve corresponding to the luminance threshold from the luminance adjustment curves as the target luminance adjustment curve.

Optionally, the first determining unit is configured to determine the adjustment intensity by using the following formula:

$$S=(T-La)*k.$$

where S is the adjustment intensity, T is the luminance threshold, La is the luminance distribution intensity of the adjacent pixels, and k is a constant factor.

The second determining unit is configured to determine the target luminance adjustment curve by using the following formula:

$$L'=Lc+S*\sin(PI*Lc/T),$$

where L' is the target luminance adjustment curve, Lc is the original luminance, and PI is a constant π.

Figure 10:
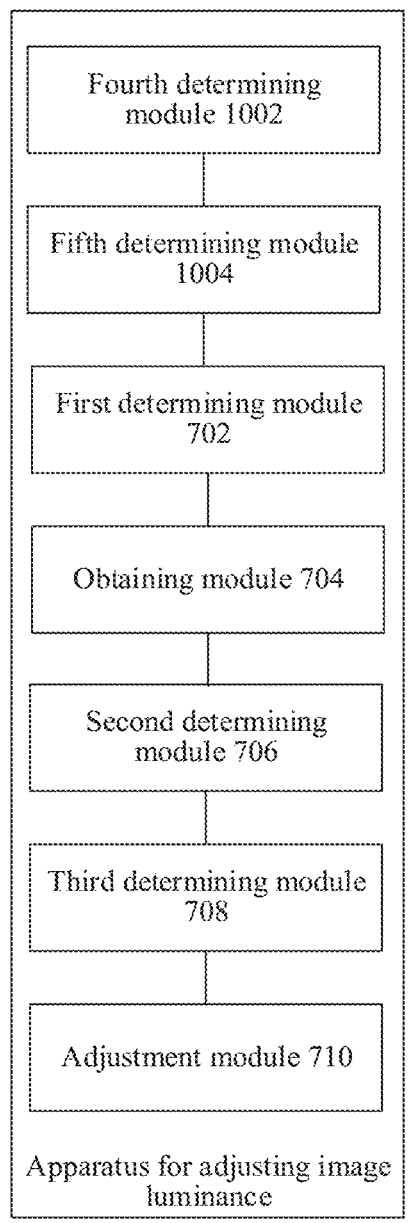
FIG. 10 is a schematic diagram 4 of an apparatus for adjusting image luminance according to an embodiment of this application.

FIG. 10 is a schematic diagram 4 of an apparatus for adjusting image luminance according to an embodiment of this application. Optionally, the foregoing apparatus further includes:

a fourth determining module 1002, configured to determine the average luminance of the pixels in the original image by using a Mipmap function of a graphics processing unit (GPU) graphics pipeline; and a fifth determining module 1004, configured to determine the luminance threshold according to the average luminance of the pixels in the original image, a greater luminance average indicating a greater luminance threshold.

In some embodiments, current smartphones are all equipped with a high-performance GPU graphics pipeline architecture. The GPU graphics pipelines are all formulated following the same standard (OpenGL ES). Therefore, if the calculation of the average luminance and the adjacent luminance distribution intensity is implemented by using the GPU graphics pipeline, not only the calculation time required can be greatly reduced, but also it can be ensured that this method can run on most smartphones.

In some embodiments, the average luminance and the luminance distribution intensity may be determined by using the Mipmap function of the GPU graphics pipeline.

Figure 11:
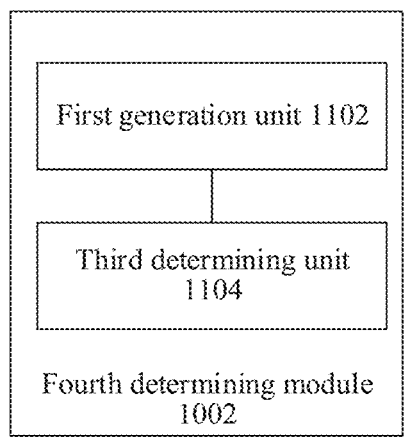
FIG. 11 is a schematic diagram 5 of an apparatus for adjusting image luminance according to an embodiment of this application.

FIG. 11 is a schematic diagram 5 of an apparatus for adjusting image luminance according to an embodiment of this application. Optionally, the fourth determining module 1002 includes:
- a first generation unit 1102, configured to generate a first image corresponding to the original image by using the Mipmap function, a resolution of the first image being 1×1; and
- a third determining unit 1104, configured to determine luminance of the first image as the average luminance of the pixels in the original image.

In some embodiments, when a Mipmap generation instruction is issued to the GPU graphics pipeline, the GPU respectively generates images with resolutions lower than that of the original image in a power-of-two attenuation manner, and the luminance of the first image with the resolution of 1×1 is determined as the average luminance of the pixels in the original image.

Figure 12:
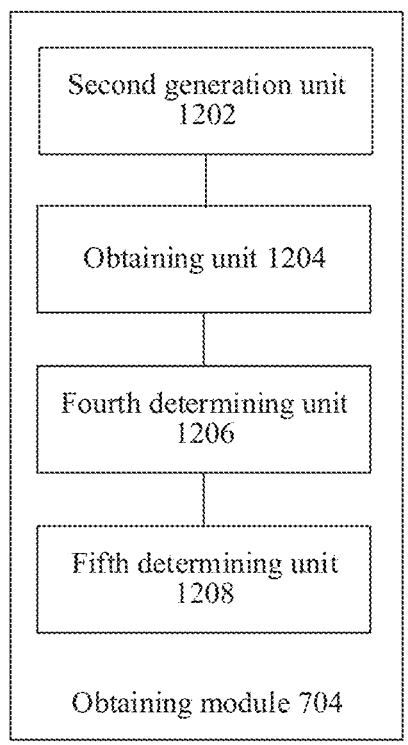
FIG. 12 is a schematic diagram 6 of an apparatus for adjusting image luminance according to an embodiment of this application.

FIG. 12 is a schematic diagram 6 of an apparatus for adjusting image luminance according to an embodiment of this application. Optionally, the obtaining module 704 includes:
- a second generation unit 1202, configured to generate a second image corresponding to the original image by using a Mipmap function of a GPU graphics pipeline, a resolution of the second image being less than a resolution of the original image;
- an obtaining unit 1204, configured to obtain a first position of the target pixel on the original image;
- a fourth determining unit 1206, configured to determine a second position corresponding to the first position on the second image; and
- a fifth determining unit 1208, configured to determine luminance of a pixel located at the second position on the second image as the luminance distribution intensity of the adjacent pixels.

In some embodiments, the Mipmap function may be used to accelerate the process of calculating the luminance distribution intensity of the adjacent pixels. Assuming that a middle-level low resolution (for example: 64×64) of a Mipmap is used as a reference, a color luminance value of each pixel in an image with the resolution of 64×64 may be regarded as a color luminance average of a block (image width divided by 64 and image height divided by 64) in the original image.

In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. For an application environment of this embodiment of this application, reference may be made but is not limited to the application environment of the foregoing embodiment. This is not described in detail in this embodiment. This embodiment of this application provides an optional specific application example for implementing the foregoing object display method.

Figure 13:
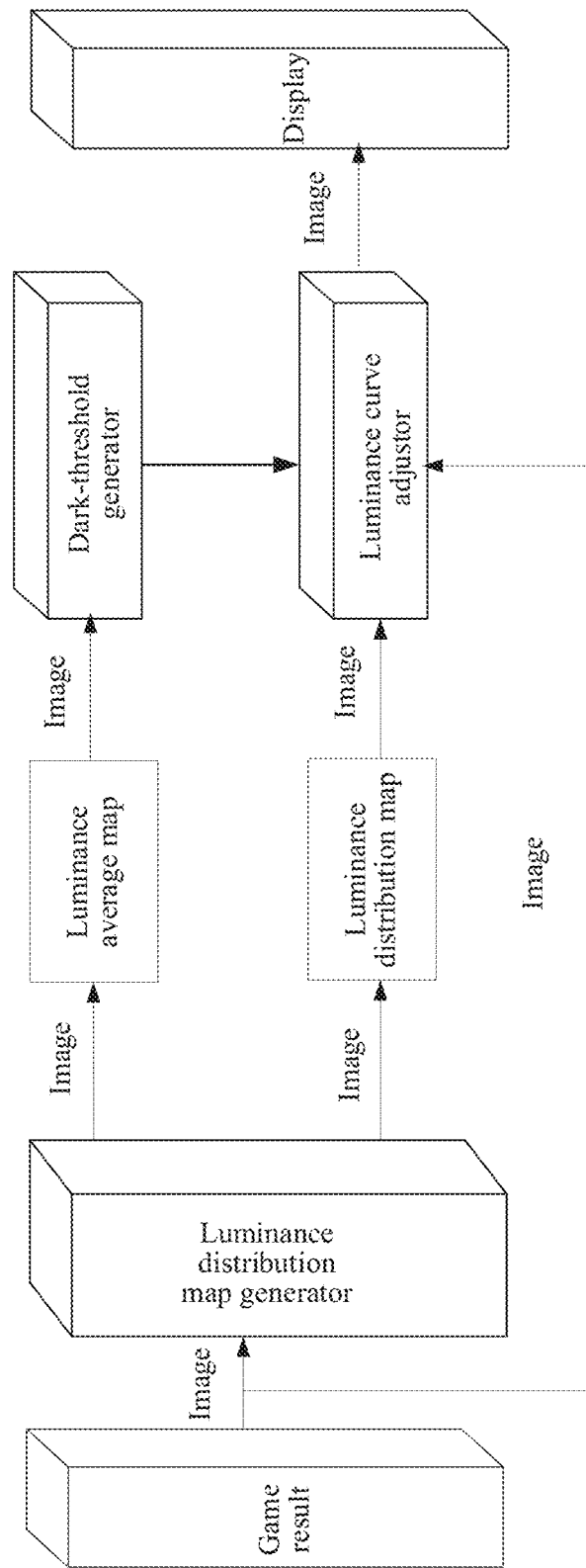
FIG. 13 is a schematic diagram 1 of an application scenario of a method for adjusting image luminance according to an embodiment of this application.

In some embodiments, the foregoing method for adjusting image luminance may be applied to, but not limited to, a scenario in which an image is displayed on a terminal as shown in FIG. 13. In this scenario, a system for adjusting image luminance is provided. The system includes the following modules:

A luminance distribution intensity generator module is included, where the meaning of luminance distribution intensity is to record a luminance distribution intensity of another pixel around a pixel in an image, which is used to determine a curvature of a target luminance adjustment curve when luminance of the pixel needs to be enhanced. The image may be directly represented by a small image at an order with a low resolution in the Mipmap.

The meaning of luminance average map is an average luminance result of an entire picture. The image may be directly represented by a small image with a lowest resolution 1×1 in the Mipmap.

A function of the luminance distribution intensity generator module is mainly to generate a luminance distribution intensity and an average luminance map. According to the previous explanation, the entire module function can be obtained only by calling the Mipmap function of the GPU graphics pipeline, and then selecting a small image at an order of a relatively low resolution and the small image with the 1×1 resolution. Because the entire module uses the Mipmap function, computing costs required overall are greatly reduced.

A dark-threshold generator module is included. The dark-threshold is a luminance threshold, and is used to determine whether a pixel in an image needs luminance adjustment. Because the luminance threshold is based on an average luminance of the entire image, the result of the image with the 1×1 resolution in the Mipmap generated by the luminance distribution intensity generator in the previous step may be directly used without an additional computing cost.

A luminance curve adjustor module is included, and is a curve generator module configured to adjust luminance of a pixel. The module is mainly configured to generate, according to a difference between a luminance distribution intensity around a pixel and a luminance threshold, a target luminance adjustment curve consistent with a curvature of the difference, and determine target luminance through the curve. A mathematical formula of the curve generator is a combination of extremely low-cost mathematical expressions as shown previously. In addition, the curve generation process may be integrated into the fragment shader in the GPU graphics pipeline together with the subsequent processing of whether to perform pixel adjustment. By using a multi-threaded synchronization processing mechanism in the GPU, the cost of the entire calculation becomes very low, which ensures effective operation of a dark part adjustment mechanism.

Figure 14:
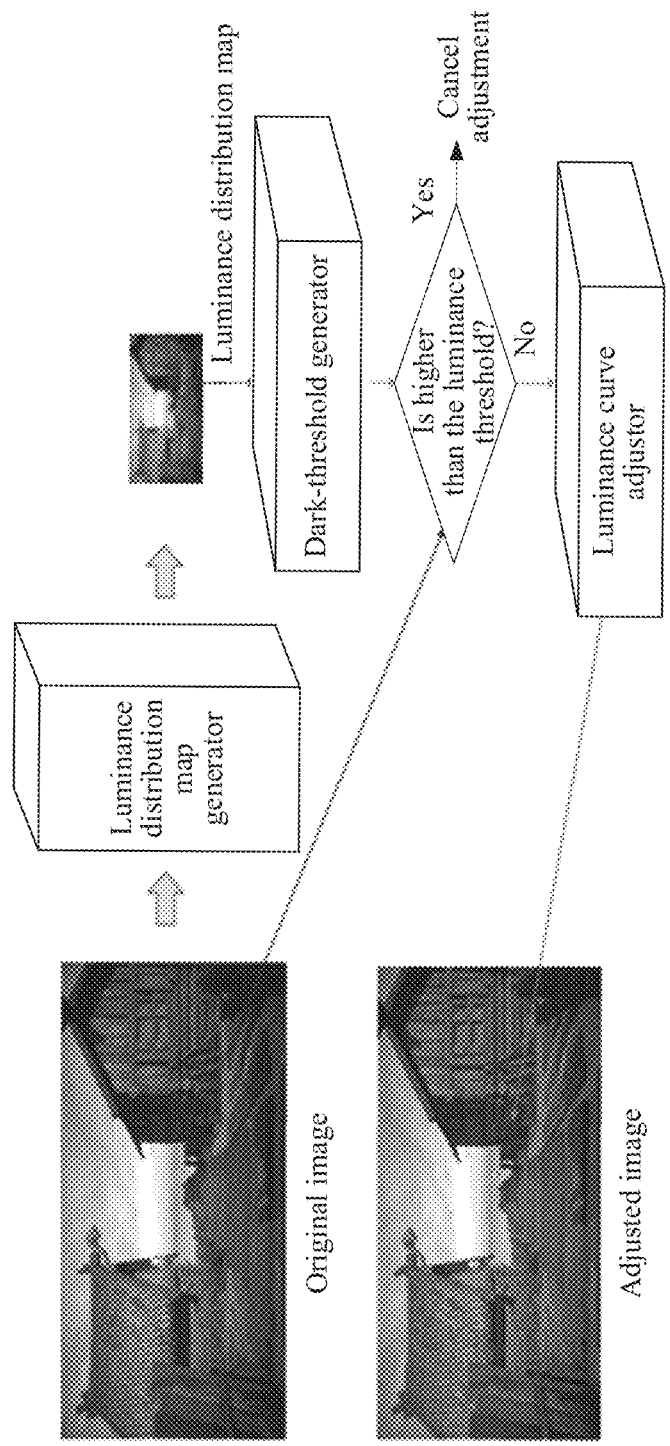
FIG. 14 is a schematic diagram 2 of an application scenario of a method for adjusting image luminance according to an embodiment of this application.

In some embodiments, as shown in FIG. 14, the luminance distribution intensity module generates, from the original image and by using the Mipmap function, a luminance distribution intensity representing a luminance distribution intensity around each pixel and an overall luminance average map with a 1×1 resolution.

Each pixel in the image runs the fragment shader in the GPU graphics pipeline, where an average luminance of the entire image is obtained from the average luminance map with a 1×1 resolution, and a luminance threshold is generated via the dark-threshold generator. Each pixel in the image queries the luminance distribution intensity to obtain the luminance distribution intensity around the pixel. The luminance distribution intensity around the pixel is compared with the luminance threshold. If the luminance distribution intensity around the pixel is higher than the luminance threshold, no luminance adjustment is performed. If the luminance distribution intensity around the pixel is lower than the luminance threshold, a difference between the luminance distribution intensity around the pixel and the luminance threshold is calculated. The luminance difference passes through the luminance curve adjustor to obtain a query curve consistent with the difference. Then the curve is used to determine and adjust the target luminance of the pixel.

By using the foregoing method, a mechanism of a necessary GPU graphics pipeline process in a smartphone may be used to implement a regional dynamic image luminance enhancement technology that originally requires a lot of computing costs and system resources to be implemented. Because this method is implemented purely through a necessary GPU graphics pipeline unit in the hardware, the method can run on most smartphone products on the market. As the performance of mobile phones is optimized year by year, the performance of GPU graphics pipeline units is updated year by year, form which this technology can benefit, to reduce more computing performance costs.

Figure 15:
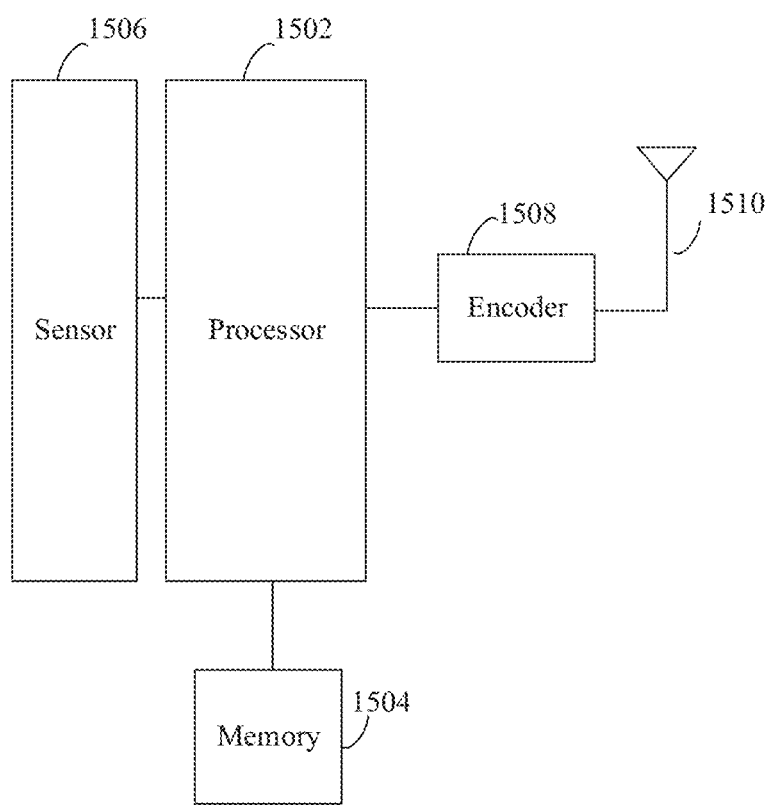
FIG. 15 is a schematic diagram of an electronic device according to an embodiment of this application.

According to still another aspect of the embodiments of this application, an electronic device configured to perform the foregoing method for adjusting image luminance is further provided. As shown in FIG. 15, the electronic device includes: one or more (only one is shown in the figure) processors 1502, a memory 1504, a sensor 1506, an encoder 1508, and a transmission apparatus 1510. The memory stores a computer program, and the processor is configured to perform, by using the computer program, the steps in any one of the foregoing method embodiments.

In some embodiments, the electronic device may be located in at least one of a plurality of network electronic devices of a computer network.

In some embodiments, the processor may be configured to perform the following steps by using a computer program:
  S51. Determine a target pixel with original luminance lower than a luminance threshold in an original image, the luminance threshold being a threshold determined according to luminance of pixels in the original image.
  S52. Obtain a luminance distribution intensity of pixels adjacent to the target pixel in the original image.
  S53. Determine a difference between the luminance threshold and the luminance distribution intensity of the adjacent pixels.
  S54. Adjust the target pixel to corresponding target luminance according to the difference and the original luminance of the target pixel.

Optionally, a person of ordinary skill in the art may understand that, the structure shown in FIG. 15 is only illustrative. The electronic device may be alternatively a terminal device such as a smartphone (for example, an Android mobile phone or an iOS mobile phone), a tablet computer, a palmtop computer, a mobile Internet device (MID), or a PAD. FIG. 15 does not constitute a limitation on a structure of the foregoing electronic device. For example, the electronic device may alternatively include more or fewer components (such as a network interface and a display device) than those shown in FIG. 15, or has a configuration different from that shown in FIG. 15.

The memory 1504 may be configured to store a software program and module, for example, a program instruction/module corresponding to the method and apparatus for adjusting image luminance in the embodiments of this application. The processor 1502 runs the software program and module stored in the memory 1504, to perform various functional application and data processing, that is, implement the foregoing target component and control method. The memory 1504 may include a high-speed random access memory, and may also include a non-volatile memory, for example, one or more magnetic storage apparatuses, a flash memory, or another non-volatile solid-state memory. In some embodiments, the memory 1504 may further include memories remotely disposed relative to the processor 1502, and the remote memories may be connected to a terminal by using a network. Examples of the network include, but not limited to, the Internet, an intranet, a local area network, a mobile communication network, and a combination thereof.

The transmission apparatus 1510 is configured to receive or transmit data by using a network. Specific examples of the foregoing network may include a wired network and a wireless network. In an example, the transmission apparatus 1510 includes a network interface controller (NIC). The NIC may be connected to another network device and a router by using a network cable, to communicate with the Internet or a local area network. In an example, the transmission apparatus 1510 is a radio frequency (RF) module, which communicates with the Internet in a wireless manner.

Specifically, the memory 1504 is configured to store an application.

An embodiment of this application further provides a storage medium, storing a computer program, the computer program being configured to perform steps in any one of the foregoing method embodiments when being run.

In some embodiments, the storage medium may be configured to store a computer program for performing the following steps:
  S61. Determine a target pixel with original luminance lower than a luminance threshold in an original image, the luminance threshold being a threshold determined according to luminance of pixels in the original image.
  S62. Obtain a luminance distribution intensity of pixels adjacent to the target pixel in the original image.
  S63. Determine a difference between the luminance threshold and the luminance distribution intensity of the adjacent pixels.
  S64. Adjust the target pixel to corresponding target luminance according to the difference and the original luminance of the target pixel.

Optionally, the storage medium is further configured to store a computer program used for performing the steps included in the methods according to the foregoing embodiments, and details are not described again in this embodiment.

In some embodiments, a person of ordinary skill in the art may understand that all or some of the steps of the methods in the foregoing embodiments may be implemented by a program instructing relevant hardware of the terminal device. The program may be stored in a computer-readable storage medium, and the storage medium may include a flash disk, a read-only memory (ROM), a random access memory (RAM), a magnetic disk, an optical disc, or the like.

An embodiment of this application further provides a computer program product including instructions, the computer program product, when run on a computer, causing the computer to perform the method according to any one of the foregoing aspects.

The sequence numbers of the foregoing embodiments of this application are merely for description purposes, and are not intended to indicate the preference among the embodiments.

When the integrated unit in the foregoing embodiments is implemented in a form of a software functional unit and sold or used as an independent product, the integrated unit may be stored in the foregoing computer-readable storage medium. Based on such an understanding, the technical solutions of this application essentially, or the part contributing to the related art, or all or some of the technical solutions may be implemented in a form of a software product. The computer software product is stored in a storage medium and includes several instructions for instructing one or more computer devices (which may be a personal computer, a server, a network device, and the like) to perform all or some of the steps of the methods described in the embodiments of this application.

In the foregoing embodiments of this application, descriptions of the embodiments have respective focuses. As for parts that are not described in detail in one embodiment, reference may be made to the relevant descriptions of the other embodiments.

In the several embodiments provided in this application, it is to be understood that, the disclosed client may be implemented in another manner. The apparatus embodiments described above are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the units or modules may be implemented in electrical or other forms.

The units described as separate components may or may not be physically separated, and the components displayed as units may or may not be physical units, and may be located in one place or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

The foregoing descriptions are merely exemplary implementations of this application. A person of ordinary skill in the art may further make several improvements and modifications without departing from the principle of this application, and the improvements and modifications are also considered as falling within the protection scope of this application.

What is claimed is:

1. A method for adjusting image luminance performed at an electronic device, the method comprising:
    determining that an original luminance of a target pixel in an image is lower than a luminance threshold of the image, the luminance threshold being determined according to luminance of pixels in the image;
    in accordance with the determination:
    obtaining a luminance distribution intensity of pixels adjacent to the target pixel in the image; and
    adjusting the original luminance of the target pixel to a corresponding target luminance according to the luminance threshold and the luminance distribution intensity of the adjacent pixels.

2. The method according to claim 1, wherein the adjusting the original luminance of the target pixel to a corresponding target luminance according to the luminance threshold and the luminance distribution intensity of the adjacent pixels comprises:
    determining a luminance difference between the luminance threshold and the luminance distribution intensity of the adjacent pixels; and
    adjusting the original luminance of the target pixel to the corresponding target luminance according to the luminance difference between the luminance threshold and the luminance distribution intensity of the adjacent pixels.

3. The method according to claim 2, wherein the adjusting the original luminance of the target pixel to the corresponding target luminance according to the luminance difference between the luminance threshold and the luminance distribution intensity of the adjacent pixels comprises:
    determining a target luminance adjustment curve corresponding to the luminance difference between the luminance threshold and the luminance distribution intensity of the adjacent pixels; and
    adjusting the original luminance of the target pixel to the corresponding target luminance according to the target luminance adjustment curve.

4. The method according to claim 3, wherein the determining a target luminance adjustment curve corresponding to the difference comprises:
    determining an adjustment intensity corresponding to the target pixel according to the luminance difference; and
    determining the target luminance adjustment curve according to the adjustment intensity and the luminance threshold.

5. The method according to claim 2, wherein the determining a luminance difference between the luminance threshold and the luminance distribution intensity of the adjacent pixels comprises:
    determining the luminance difference between the luminance threshold and the luminance distribution intensity of the adjacent pixels to be zero when the luminance distribution intensity is higher than the luminance threshold.

6. The method according to claim 1, wherein the luminance threshold of the pixels in the image is determined by using a Mipmap function of a graphics processing unit (GPU) graphics pipeline.

7. The method according to claim 6, wherein the determining the luminance threshold of the pixels in the image by using a Mipmap function of a graphics processing unit (GPU) graphics pipeline comprises:
    generating a first image corresponding to the image by using the Mipmap function, a resolution of the first image being 1×1; and
    determining luminance of the first image as the luminance threshold of the pixels in the image.

8. The method according to claim 1, wherein the obtaining a luminance distribution intensity of pixels adjacent to the target pixel in the image comprises:
    generating a second image corresponding to the image by using a Mipmap function of a GPU graphics pipeline, a resolution of the second image being less than a resolution of the image;
    obtaining a first position of the target pixel on the image;

determining a second position corresponding to the first position on the second image; and determining luminance of a pixel located at the second position on the second image as the luminance distribution intensity of the adjacent pixels.

9. An electronic device, comprising a memory and a processor, the memory storing a plurality of computer programs that, when executed by the processor, cause the electronic device to perform a method for adjusting image luminance including:

determining that an original luminance of a target pixel in an image is lower than a luminance threshold of the image, the luminance threshold being determined according to luminance of pixels in the image;

in accordance with the determination:

obtaining a luminance distribution intensity of pixels adjacent to the target pixel in the image; and adjusting the original luminance of the target pixel to a corresponding target luminance according to the luminance threshold and the luminance distribution intensity of the adjacent pixels.

10. The electronic device according to claim 9, wherein the adjusting the original luminance of the target pixel to a corresponding target luminance according to the luminance threshold and the luminance distribution intensity of the adjacent pixels comprises:

determining a luminance difference between the luminance threshold and the luminance distribution intensity of the adjacent pixels; and adjusting the original luminance of the target pixel to the corresponding target luminance according to the luminance difference between the luminance threshold and the luminance distribution intensity of the adjacent pixels.

11. The electronic device according to claim 10, wherein the adjusting the original luminance of the target pixel to the corresponding target luminance according to the luminance difference between the luminance threshold and the luminance distribution intensity of the adjacent pixels comprises:

determining a target luminance adjustment curve corresponding to the luminance difference between the luminance threshold and the luminance distribution intensity of the adjacent pixels; and adjusting the original luminance of the target pixel to the corresponding target luminance according to the target luminance adjustment curve.

12. The electronic device according to claim 11, wherein the determining a target luminance adjustment curve corresponding to the difference comprises:

determining an adjustment intensity corresponding to the target pixel according to the luminance difference; and determining the target luminance adjustment curve according to the adjustment intensity and the luminance threshold.

13. The electronic device according to claim 10, wherein the determining a luminance difference between the luminance threshold and the luminance distribution intensity of the adjacent pixels comprises:

determining the luminance difference between the luminance threshold and the luminance distribution intensity of the adjacent pixels to be zero when the luminance distribution intensity is higher than the luminance threshold.

14. The electronic device according to claim 9, wherein the luminance threshold of the pixels in the image is determined by using a Mipmap function of a graphics processing unit (GPU) graphics pipeline.

15. The electronic device according to claim 14, wherein the determining the luminance threshold of the pixels in the image by using a Mipmap function of a graphics processing unit (GPU) graphics pipeline comprises:

generating a first image corresponding to the image by using the Mipmap function, a resolution of the first image being 1×1; and determining luminance of the first image as the luminance threshold of the pixels in the image.

16. The electronic device according to claim 9, wherein the obtaining a luminance distribution intensity of pixels adjacent to the target pixel in the image comprises:

generating a second image corresponding to the image by using a Mipmap function of a GPU graphics pipeline, a resolution of the second image being less than a resolution of the image;

obtaining a first position of the target pixel on the image;

determining a second position corresponding to the first position on the second image; and determining luminance of a pixel located at the second position on the second image as the luminance distribution intensity of the adjacent pixels.

17. A non-transitory computer-readable storage medium, storing a plurality of computer programs that, when executed by a processor of an electronic device, cause the electronic device to perform a method for adjusting image luminance including:

determining that an original luminance of a target pixel in an image is lower than a luminance threshold of the image, the luminance threshold being determined according to luminance of pixels in the image;

in accordance with the determination:

obtaining a luminance distribution intensity of pixels adjacent to the target pixel in the image; and adjusting the original luminance of the target pixel to a corresponding target luminance according to the luminance threshold and the luminance distribution intensity of the adjacent pixels.

18. The non-transitory computer-readable storage medium according to claim 17, wherein the adjusting the original luminance of the target pixel to a corresponding target luminance according to the luminance threshold and the luminance distribution intensity of the adjacent pixels comprises:

determining a luminance difference between the luminance threshold and the luminance distribution intensity of the adjacent pixels; and adjusting the original luminance of the target pixel to the corresponding target luminance according to the luminance difference between the luminance threshold and the luminance distribution intensity of the adjacent pixels.

19. The non-transitory computer-readable storage medium according to claim 18, wherein the adjusting the original luminance of the target pixel to a corresponding target luminance according to the luminance difference comprises:

determining a target luminance adjustment curve corresponding to the luminance difference between the luminance threshold and the luminance distribution intensity of the adjacent pixels; and adjusting the original luminance of the target pixel to the corresponding target luminance according to the target luminance adjustment curve.

20. The non-transitory computer-readable storage medium according to claim 17, wherein the luminance threshold of the pixels in the image is determined in the image by using a Mipmap function of a graphics processing unit (GPU) graphics pipeline.

21. The non-transitory computer-readable storage medium according to claim 20, wherein the determining the luminance threshold of the pixels in the image by using a Mipmap function of a graphics processing unit (GPU) graphics pipeline comprises:
   generating a first image corresponding to the image by using the Mipmap function, a resolution of the first image being 1×1; and
   determining luminance of the first image as the luminance threshold of the pixels in the image.

22. The non-transitory computer-readable storage medium according to claim 17, wherein the obtaining a luminance distribution intensity of pixels adjacent to the target pixel in the image comprises:
   generating a second image corresponding to the image by using a Mipmap function of a GPU graphics pipeline, a resolution of the second image being less than a resolution of the image;
   obtaining a first position of the target pixel on the image;
   determining a second position corresponding to the first position on the second image; and
   determining luminance of a pixel located at the second position on the second image as the luminance distribution intensity of the adjacent pixels.

* * * * *